Oct. 15, 1935.  G. H. McCOY ET AL  2,017,468
METHOD OF PRODUCING PHOSPHATIC MATERIALS
Filed June 26, 1930
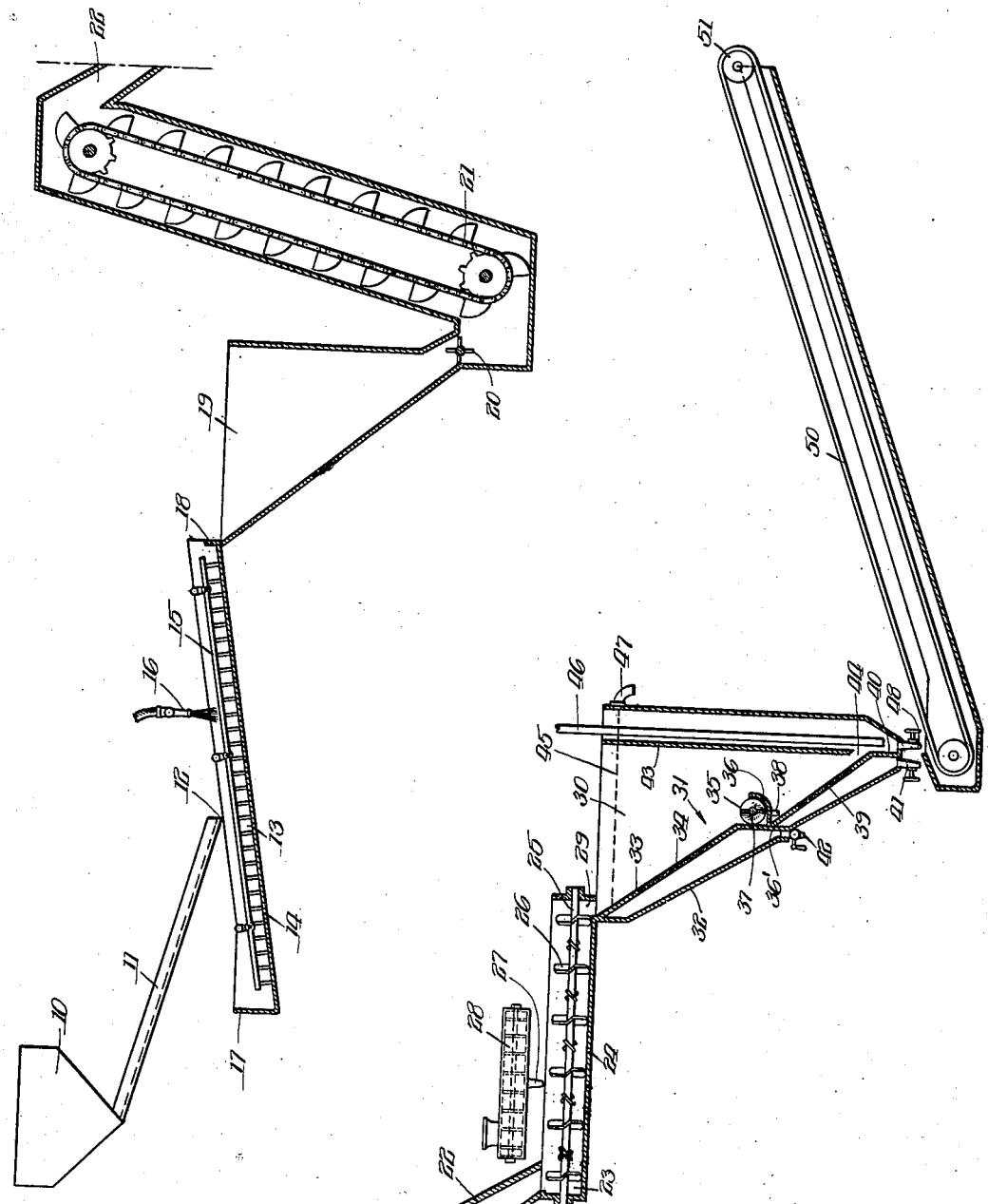
Inventors:
George H. McCoy
David M. Wright
J. Pankey Hall,
By Wilkinson, Huxley, Byron & Knight
Attys Patented Oct. 15, 1935

2,017,468

UNITED STATES PATENT OFFICE 2,017,468

METHOD OF PRODUCING PHOSPHATIC MATERIALS

George H. McCoy, David M. Wright, and Jesse Pankey Hall, Bartow, Fla., assignors, by mesne assignments, to Swift and Company Fertilizer Works, Chicago, Ill., a corporation of Delaware Application June 26, 1930, Serial No. 463,984

12 Claims. (Cl. 209—49)

This invention relates to a new and improved process for recovering phosphatic materials and to a novel apparatus which may be used in practicing the process.

Phosphate rock, or calcium phosphate, as it is known chemically, has various uses in industry, one of which is for the production of superphosphate in the manufacture of fertilizer. Phosphate rock exists in natural deposits in certain localities and is obtanied by a mining process. As it is removed from the ground, it exists mixed with impurities such as sand and clay and is usually of varying physical sizes, ranging from the size of ordinary gravel down to minute particles about the size of sand particles.

By a mechanical process, such as screening and the like, the larger sized particles can be readily separated and recovered without difficulty and heretofore it has been the practice to run the mined material through a screen of approximately twenty mesh, and to discard all of the smaller or undersized portion thereof as waste.

It has been known however, that a relatively large portion of the rock phosphate exists as small particles, about the size of ordinary sand, or smaller, and therefore, a relatively high percentage of the rock phosphate passes through the twenty mesh screen and is discarded with the waste material.

This invention therefore, relates more particularly to a process by which the rock phosphate material which has formerly been discarded as waste, may be separated from the sand and foreign material and recovered for use.

It is a further object to recover such material by a simple and inexpensive process and one which involves relatively simple and inexpensive mechanism, all of which may be operated with a high degree of success, without requiring highly trained or skilled labor or unusual care in practice.

These and other objects not specifically enumerated will readily appear to one skilled in the art as the following description proceeds.

The process will be first described and then specific reference will be made to the apparatus disclosed in the accompanying drawing by which the process may be practiced.

After the initial screening operation above referred to, by which the larger or pebble size particles of rock phosphate are recovered under the present process, the under-sized portion of the mined material is next subjected to a washing operation, during which a large portion of the dirt, sand and other foreign material is removed. The remaining washed material which is a mixture of sand and rock phosphate of about equal size, is then conveyed to a mixer, where it is mixed with an agglomerating substance. The agglomerating substance may be of any suitable kind, it being necessary however, that the material have the joint properties of, first, an affinity for the rock phosphate and not the sand particles, and, secondly, as applied to the rock phosphate particles, to cause particles to adhere together by agglomeration, to form from the smaller particles of rock phosphate, larger agglomerated particles, for a purpose hereinafter more specifically set forth.

This invention is not to be limited to any particular agglomerating agent, as any substance known to exhibit the properties referred to, will serve satisfactorily, but for the purposes of illustrating the present invention, in practicable and workable form, the agglomerating agent may be an emulsion of soap and oil, such as for instance, any kind of cheap mineral oil, such as fuel oil, and any fatty acid or rosin soap, preferably the former, of a cheap grade. These products are emulsified in a suitable apparatus with a small quantity of water, which is added thereto.

After the mixing process referred to, it will be found that the rock phosphate particles are agglomerated and exist in larger physical form than the particles of sand. The mixture is then fed forward and deposited onto an apparatus which is effective to mechanically separate the particles on the basis of their size, such as for instance, by passing over a screen which will permit the smaller sand particles to fall through and the larger agglomerated particles of rock phosphate to pass over the screen.

In further practicing the process, after an initial separation has been effected on the basis of the above action, the agglomerated particles may be again mixed and broken up and allowed to agglomerate a second time, all for the purpose of freeing any particles of sand or other impurities which may have been entrapped in the agglomerated particles in the first instance. After this operation, a second separation may be effected in the same manner, such as by passing over a second screen. This second step, is a refinement process and makes for a more purified final product. After the above described separating action, the sand and other impurities, may be discarded and the agglomerated phosphatic material collected and prepared for further treatment.

It may be desirable, after the second separating action, to re-introduce the waste material for treatment for the purpose of recovering any phosphatic material that may have passed through with the waste in the second separating action. This may or may not be desirable, depending upon the results obtained in the first treatment. If it is found that the mixing action of the agglomerated phosphatic material for the purpose of releasing the entrapped impurities, acts to break up the agglomerated material to an extent to permit the same to pass through with the impurities and sand, in the second separating action, the present invention contemplates a re-introduction and processing of this waste material to recover and secure a higher yield of phosphatic material.

The essential feature of this process, is that of agglomerating the phosphatic material and not the sand and impurities and taking advantage of the difference in the physical size of the respective materials as they exist in this form and effecting mechanically, a separation of the phosphatic material from the sand and impurities, by means effective to separate particles of different size.

By referring to the drawing, one preferred apparatus by which the process may be practiced, will now be described.

Figure 1 of the drawing, is a diagrammatic representation of one half of the apparatus, contemplated in this invention, and Figure 2 shows the remaining half, the entire apparatus being disclosed when Figure 2 is placed at the right hand end of Figure 1.

By referring to the figures of the drawing, it will be noted that the present invention is illustrated as embodied in an apparatus which consists of a de-watering box 10, on the washer which is in the form of a hopper or container which receives the under-sized particles as they pass through the screen in the first screening operation. As above described, this invention is limited to the treatment of that portion of the mined material which is discarded in the recovery of pebble sized material and coarse phosphate sand. The material next passes from the de-watering box 10, by a suitable conveyor, such as the chute 11, into an intermediate portion as at 12, of a classifier such as the rake classifier 13.

This classifier comprises an inclined trough 14, having an oscillating rake conveying means 15, located therein mounted and connected to produce the desired mechanical movement. Water is introduced into the classifier by means of a pipe 16, at substantially the location shown, whereby water, in flowing down the incline, moves in a direction opposed to the upward movement of the material as conveyed by the action of the rake conveyor.

This treatment is effective to wash the material free of a large portion of the dirt, silt and other impurities which may become suspended in the water, which passes in contact therewith. Such suspended material is caused to overflow at the lower end 17.

The washed material is then caused to pass out of the upper end 18 of the classifier and fall into a bin 19, positioned to receive the same. The bin is provided with an inclined floor, so that the material therein will be fed to the lower end where it encounters an automatic feeder 20, which causes predetermined portions thereof to be discharged from the bin, and fed to the conveyor buckets of a conveyor or elevator 21.

The conveyor may be of any suitable construction and therefore is only shown diagrammatically and will not be described in detail here. In any event, the material is conveyed by the conveyor or elevator to the elevated position and discharged into the chute 22, and into the mixer 23, at the left hand end thereof, as shown in the drawing.

The mixer 23, comprises a trough 24, in which two rotary shafts 25, are mounted, one beside the other, on which shafts radially disposed blades 26, are mounted having inclined faces thereon, of a construction suitable for conveying the material through the mixer from left to right, as shown in the drawing.

As the material is conveyed through the mixer referred to, it is caused to be agitated and intimately mixed with the agglomerating material, which is introduced as at 27, from the emulsifier 28. The emulsifier likewise may be of any suitable construction and therefore the specific details of which are not referred to here.

The emulsifier is preferably a suitable mechanism which will be operable to produce an emulsion of an oil such as a cheap fuel oil, and a suitable soap, such as a fatty acid or rosin soap, preferably of a cheap character.

A suitable quantity of water is also introduced into the emulsifier and is mixed into the emulsion. The quantity of emulsion introduced into the mixture, may be varied according to different conditions and according to the results desired, but that quantity should be introduced which will be effective to agglomerate the phosphatic material an extent sufficient to permit its mechanical separation on the basis of its physical size.

After the mixture is so treated, the material is discharged from the end 29, of the mixing apparatus and is fed into the separator 30, which will now be described.

The separator in the present illustration, comprises a tank 31, which is preferably of the construction shown, namely, of a general triangular shape, from the side view, having an inclined bottom 32. The tank is provided with an inclined surface 33, and a stationary screen 34, which is mounted spaced above the floor 32. The screen extends downwardly at about the same angle as the floor and terminates in a mixing device 35. A partition 36', is provided, extending vertically from the floor, on the left side of which a valve outlet 42 is provided for the discharge of tailings as waste. The mixer referred to, comprises a semi-cylindrical trough 36, having its upper edge connected with the lower end of the screen, whereby it serves as a gutter for receiving the material which falls off of the lower end of the screen 34. The trough 36 is provided with a shaft 37, mounted therein, on which mixing and conveying blades of any suitable construction are mounted for engagement with the collected material and for producing a joint breaking up, mixing and conveying action thereon.

The trough may be provided with a series of outlet openings 38, spaced apart along the width of the apparatus, that is, transversely of the tank 31, through which the material in the trough 36 may be discharged. It will be apparent that the conveyors may be arranged so as to convey the material collected in any particular space between outlet openings toward a particular outlet opening, so that the result will be that the material caught in the trough will be agitated and conveyed laterally and finally discharged through one of the outlet openings 38, onto the lower screen 39, which is disposed on an incline, in the same manner as the upper screen 34.

In practice therefore, the agglomerated particles which do not pass through the upper screen, are caused to fall into the mixer, where they are broken up and re-agglomerated and are subsequently passed over the lower screen. This effects a release and final separation of any silicious constituents such as particles of sand as well as other impurities which may have been caught or entrapped in the agglomerated material. At the lower end of the screen 39, a vertical partition 40 is disposed at the left side of which, a second outlet valve 41 is provided, for discharging the waste sand which passes through the screen.

As above mentioned in connection with the description of the process, if it is found that this material contains sufficient phosphatic material, it may be worked over for the purpose of recovering such material.

The tank is further provided with a vertical partition 43, which extends from the top thereof, downwardly toward the partition 40, but spaced therefrom to provide the opening 44, through which the phosphatic material passes from the lower end of the screen 39.

The tank 31 is kept full of water up to approximately the level, represented by the level line 45, the water being fed thereto through a pipe 46, which discharges at the location of the bottom of the tank. An overflow pipe 47 is also provided which guarantees a constant level of water therein.

As the phosphatic material falls from the lower screen, 39, it passes to the lower portion of the tank 31, and accumulates at the location of the discharge spigot 48 which may be controlled to discharge the contents of the tank onto a suitable means for conveying it away for treatment, storage or shipment.

This material will of course, have a certain quantity of water mixed therewith, but it is found in practice, that the accumulated material at the location of the spigot, is effective to substantially seal the tank against a large discharge of water so that the preponderance of the discharge is that of phosphatic material. The material however, being quite moist or semi-fluid in character is capable of being conveyed by means of a pump or any other conveyor such as is represented in the drawing by the drag elevator 50. This elevator is of ordinary construction and will not be described in detail, it being merely understood that the conveyor permits the liquid portion, such as the water, to flow off of the material and the material to be discharged at its upper end 51 into bins, railroad cars or other conveyors as desired.

An alternative method would be to pump the material to a higher elevation into an apparatus such as a cone classifier in which the water is separated from the material and passes back to the apparatus for re-use.

It has been found in practice that the screens of the present apparatus require cleaning from time to time in order to free the wire mesh of material which accumulates thereon and impairs the separating operation. The applicants have discovered that the screens may be kept clean if a quantity of kerosene is introduced into the agglomerated mixture of phosphatic materials and impurities while being treated in the mixture. It is not essential to introduce kerosene continuously but merely periodically in such quantity as is sufficient to adequately clean the screen of the material collected thereon. The quantity of kerosene may be varied and governed according to the nature of the material and the condition of the screen, which will vary somewhat according to the period selected for the cleaning action. One of the advantages of the present process is that it is capable of performing the separating action by a continuous process, which process may be maintained continuous by the hereindescribed cleaning operation. The periodic introduction of kerosene for cleaning the screen is found to maintain the screen clean and entirely free of accumulated materials at all times whereby the process may be continuous with substantially the same results throughout. This, of course, eliminates the otherwise necessary procedure of periodically shutting down for the purpose of cleaning the screen.

The form of invention illustrated herein is not to be considered as limiting the invention in any respect, as the scope of the invention may be determined from the appended claims and an understanding of the present disclosure with an appreciation of the advantages which the invention produces therein.

We claim:

1. The method of separating phosphatic materials from sand and other impurities which consists in agglomerating the phosphatic material, while leaving the sand and other impurities in their original physical form and causing the mass to pass down an inclined screen submerged in water, of a size permitting the sand and other impurities to pass therethrough and not the agglomerated phosphatic material.

2. The method of separating phosphatic materials from sand and other impurities which consists in agglomerating the phosphatic material while leaving the sand and other impurities in their original physical form and then causing the mass to pass down a screen submerged in water to separate the agglomerated particles from the sand and impurities, then subjecting the agglomerated phosphatic material to a mixing and breaking up action, permitting a re-agglomeration thereof and finally causing same to pass down a second inclined screen submerged in water to separate the reagglomerated material from any sand and other impurities that may have been freed in the mixing and breaking up action.

3. The process which consists in mixing a mass of phosphatic material, sand and other impurities which exist in particles of substantially the same size, with an emulsion of oil, soap and water, whereby to agglomerate the phosphatic material to form particles of larger size, then passing the mass so treated over an inclined screen submerged in water and of a mesh size permitting the sand and impurities to pass therethrough and the agglomerated phosphatic material to pass thereover.

4. The continuous process which comprises treating a mixture of phosphatic material and impurities with an agglomerating agent and subsequently passing the mixture over an inclined screen submerged in water for separating the agglomerated phosphatic material from the impurities and periodically adding a quantity of kerosene to the mixture for maintaining the screen clean.

5. The method of separating phosphatic materials from sand and other impurities which consists in treating the mass with oil, and causing the same to pass down an inclined screen submerged in water, of a size permitting the sand and other impurities to pass therethrough and not the phosphatic material.

6. The process which consists in mixing a mass of phosphatic material, sand and other impurities which exist in particles of substantially the same size, with an emulsion of oil, soap and water, then passing the mass so treated over an inclined screen submerged in water and of a mesh size permitting the sand and impurities to pass therethrough and the phosphatic material to pass thereover.

7. The process which consists in mixing a mass of phosphatic material, sand and other impurities which exist in particles of substantially the same size, with oil, then passing the mass so treated over an inclined screen submerged in water and of a mesh size permitting the sand and impurities to pass therethrough and the phosphatic material to pass thereover.

8. The process which consists in mixing a mass of phosphatic material, sand and other impurities which exist in particles of substantially the same size, with an emulsion of oil, then passing the mass so treated over an inclined screen submerged in water and of a mesh size permitting the sand and impurities to pass therethrough and the phosphatic material to pass thereover.

9. The method of separating the silicious and phosphatic constituents of fine mineral phosphates which comprises, oiling said fine mineral phosphates, supplying said mineral to a screen under water, and imparting relative motion to said screen and mineral, whereupon the silicious constituents of the mineral pass through the screen and the phosphatic constituents thereof move along the screen under the water.

10. The method of separating the silicious and phosphatic constituents of fine phosphate mineral which comprises, oiling said mineral, supplying said mineral to the upper end of an inclined screen under water, and imparting relative motion to said screen and the mineral, whereupon the silicious constituents of the mineral pass through the screen and the phosphatic constituents thereof move downward along the screen under the surface of the water.

11. The method of separating the silicious and phosphatic constituents of fine mineral phosphates which comprises, oiling said fine mineral phosphates, supplying said mineral to a screen under water, said screen having holes larger than the greater part of the phosphatic constituents, and imparting relative motion to said screen and mineral, whereupon the silicious constituents of the mineral pass through the screen and the phosphatic constituents thereof move along the screen under the water.

12. The method of separating the silicious and phosphatic constitutents of fine phosphate mineral which comprises, oiling said mineral, supplying said mineral to the upper end of an inclined screen under water, said screen having holes larger than the greater part of the phosphatic constituents, and imparting relative motion to said screen and the mineral, whereupon the silicious constituents of the mineral pass through the screen and the phosphatic constitutents thereof move downward along the screen under the surface of the water.

GEORGE H. McCOY.
DAVID M. WRIGHT.
J. PANKEY HALL.